United States Patent [19]

Miller et al.

[11] Patent Number: 5,110,335
[45] Date of Patent: May 5, 1992

[54] METHOD OF GLASS SOOT DEPOSITION USING ULTRASONIC NOZZLE

[75] Inventors: Thomas J. Miller, Alpharetta, Ga.; Douglas W. Monroe, Newtown, Pa.

[73] Assignee: AT&T Bell Laboratories, Murray Hill, N.J.

[21] Appl. No.: 543,286

[22] Filed: Jun. 25, 1990

[51] Int. Cl.$^5$ .................................................. C03C 25/02
[52] U.S. Cl. .................................. 65/3.12; 65/18.2; 65/901; 427/163; 427/167
[58] Field of Search .................... 65/3.12, 18.2, 18.3, 65/901, 163, 167

[56] References Cited

U.S. PATENT DOCUMENTS

| | | | |
|---|---|---|---|
| 3,966,466 | 6/1976 | Miller | 65/2 |
| 4,345,928 | 8/1982 | Kawachi et al. | 65/18.2 |
| 4,529,427 | 7/1985 | French | 65/3.12 |
| 4,820,322 | 4/1989 | Baumgart et al. | 65/3.11 |

FOREIGN PATENT DOCUMENTS

| | | |
|---|---|---|
| 56-54241 | 5/1981 | Japan . |
| 56-88835 | 7/1981 | Japan . |
| 57-22136 | 2/1982 | Japan . |

Primary Examiner—Richard V. Fisher
Assistant Examiner—John J. Bruckner
Attorney, Agent, or Firm—R. B. Anderson

[57] ABSTRACT

In a flame hydrolysis method for depositing glass soot used ultimately to make optical fiber, a reactant that forms the glassy soot stream is delivered to the torch (20) in liquid form and an ultrasonic nozzle (34) in the torch atomizes the reactant or breaks the reactant into a fine mist without the use of a gas.

12 Claims, 3 Drawing Sheets

METHOD OF GLASS SOOT DEPOSITION USING ULTRASONIC NOZZLE

TECHNICAL FIELD

This invention relates to methods for making glass bodies and, more particularly, to methods and apparatus for depositing glass soot that is subsequently used for making optical fibers.

BACKGROUND OF THE INVENTION

Optical fibers have become increasingly important as a medium for transmitting large quantities of information in the form of lightwaves. There are a number of ways of making optical fiber, but most require the deposition of glass soot from a flame, a process known generally as flame pyrolysis or flame hydrolysis.

One glass deposition method, referred to as Outside Vapor Deposition (OVD), involves deposition of glass soot by flame pyrolysis on a mandrel to form a hollow cylindrical porous soot form of glass particulate. The deposited porous soot cylinder is then consolidated into a glass substrate tube by heating the soot cylinder, which is mounted on a mandrel, in a furnace. As described, for example, in the copending application of T. J. Miller, Ser. No. 522,613, filed May 14, 1990, hereby incorporated herein by reference, a glass preform can be made from the glass substrate tube by vapor depositing glass on the inner surface of the tube and then collapsing the entire structure. The collapsed structure can be used directly as a preform or it can be enlarged by inserting it into another tube, called an overclad tube, in accordance with the "rod-in-tube" approach, as described, for example, in the patent of J. W. Baumgart, et al., U.S. Pat. No. 4,4820,322, granted Apr. 11, 1989. The optical fiber is made by using glass drawing to pull the fiber from the heated and softened finished preform.

Another deposition method for making glass is the Vapor-phase Axial Deposition (VAD) method, as described, for example, in the patent of S. E. Miller, U.S. Pat. No. 3,966,446, granted Jun. 29, 1976, and in the patent of Kawachi et al., U.S. Pat. No. 4,345,928, issued Aug. 24, 1982. Glass soot is deposited from a flame onto a bait rod, which is rotated and slowly moved away from the flame resulting in a substantially solid soot cylinder. After consolidation, the solid structure may be used as a preform or, as before, enlarged by the rod-in-tube process to make the final preform.

In any method that is used, the cladding or outer surface portion of the final optical fiber must have a lower refractive index than that of the core, and this is normally accomplished by including impurities in either or both the clad region and/or the core region to modify the refractive index of the glass. The U.S. patent of Miller et al., Ser. No. 459,605, filed Jan. 2, 1990, for example, shows the inclusion of a fluorine constituent in the depositing flame for doping the deposited glass soot with fluorine, which tends to reduce the refractive index of the glass. The patent of D. W. Monroe et al., U.S. Pat. No. 4,915,716, granted Apr. 10, 1990, for example, describes a germanium constituent in the flame, which has the effect of increasing the refractive index. Flame pyrolysis, whether or not it includes a doping constituent, has thus become virtually indispensable for making high quality glass to be used as preforms, substrate tubes or overclad tubes.

From the foregoing, one can see that making glass by flame pyrolysis with subsequent consolidation of the deposited glass soot is used in a number of different ways to fabricate the preforms from which optical fiber may be drawn. The use of optical fiber as a transmission medium has become so widespread that it is now considered a commodity product, and great efforts are being made to achieve small reductions in the cost of making it. If one could increase the rat at which the glass soot is deposited by the flame pyrolysis method, it is recognized that one could reduce the cost of the optical fiber product.

SUMMARY OF THE INVENTION

The invention reduces the cost of making optical fiber by increasing the rate at which glass soot can be deposited by the flame pyrolysis method. The invention makes use of a generally conventional torch of the type that projects a fuel, typically a gas, that is ignited to form a flame. As with the prior art, reactants are also projected from the torch having appropriate composition and appropriate properties so as to react at the temperature produced in the flame to form a stream of glass particulate. The glass may be collected on a mandrel to form a glass soot cylinder in accordance with the OVD method or it may be used to produce a solid soot cylinder in accordance with the VAD method.

In accordance with the invention, the reactant is fed to the torch in liquid form (rather than gaseous form as is characteristic of the prior art) and is atomized or converted to a fine mist by an ultrasonic nozzle contained within the torch. The ultrasonic nozzle ejects the mist in the direction of the flame thereby causing it to react to form a glass soot stream. We have found that forming the glass soot stream in this manner significantly increases the rate of deposition of glass soot, and thus reduces the time needed for forming the soot cylinder. Of equal importance is our finding that the quality and uniformity of glass soot cylinders made in this manner are the equivalent to those made in the conventional manner.

In the torches that we have made thus far, fuel and oxygen-containing gases are projected from annular openings in the torch or arrays of circularly disposed openings, as is known in the art, to form a flame front having generally circular configuration in the plane transverse to the direction of projection of the gases. The ultrasonic nozzle is mounted in the torch such as to emit the liquid reactant mist in the same direction as the gases and within, and preferably at or near the center of, the circular flame front. The liquid reactant may be silicon tetrachloride, although other reactants could be used. With the use of the invention, it can be shown that the deposition rate of the glass soot is greatly increased, thus reducing the cost of soot cylinders and of the final optical fiber product. The invention also makes it easier to deliver the reactant to the torch and to control such delivery since it need not first be converted to a vapor as has been true in prior art deposition methods. Thus, the cost of delivery is reduced and reproducibility of the procedure is enhanced. These and other objects, features and benefits of the invention will be better understood from a consideration of the following detailed description taken in conjunction with the accompanying drawing.

DETAILED DESCRIPTION

Figure 1:
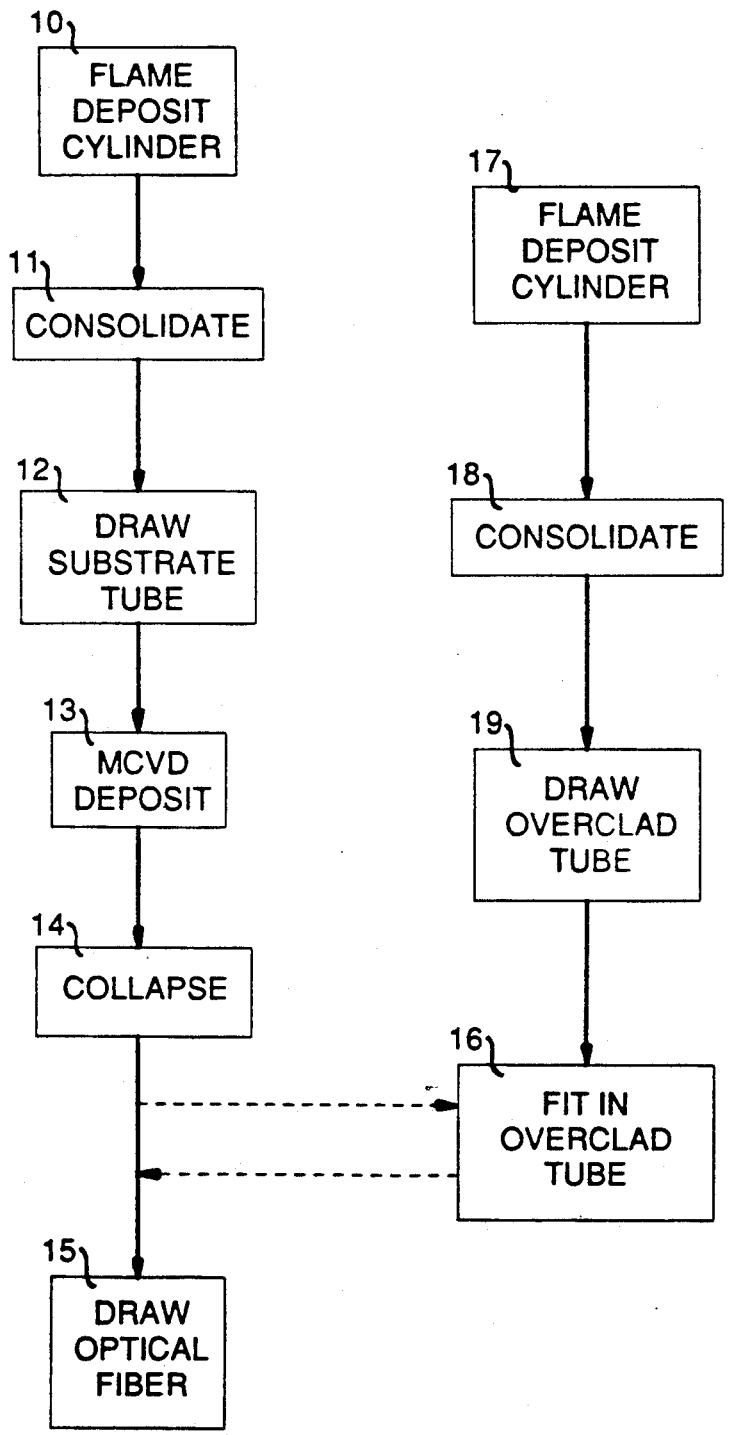
FIG. 1 is a flow chart of certain methods for making optical fibers with which the invention may be used.

It is to be understood that various elements of the drawings are not intended to be drawn to scale, but instead are sometimes purposely distorted for the purpose of illustrating the invention. Further, it is to be noted that the present invention explicitly contemplates both single mode and multi-mode optical fiber light guides, and doped and undoped glass, regardless of any specific description in the drawing or example set forth herein.

Referring now to FIG. 1, there is shown in flow chart form one method of making optical fiber in which the invention may be used. The first step 10 comprises deposition by flame pyrolysis of glass soot on a mandrel so as to make a soot cylinder. The next step 11 is to consolidate or to sinter the hollow soot cylinder into a glass tube. This step may be accomplished by heating the soot cylinder in a furnace as described in some detail in the copending application of T. J. Miller et al., Ser. No. 459,605, filed Jan. 2, 1990 and assigned jointly to the assignee company of the present application and a subsidiary company thereof. Step 12 is to draw the consolidated glass to a substrate tube of appropriate diameter. Next, as illustrated by step 13, glass is vapor deposited on the inner surface of the substrate tube by the method taught, for example, in the patent of MacChesney et al., U.S. Pat. No. 4,217,027, granted Aug. 12, 1980, and in the paper, "Fabrication of Optical Waveguides by the Vapor Deposition Process," by P. C. Schultz, *Proceedings of the IEEE*, Vol. 68, No. 10, Oct. 1980, pp. 1187–1190, now generally known as the Modified Chemical Vapor Deposition (MCVD) technique. After MCVD deposition, the substrate tube is collapsed as shown by step 14. The collapsed glass constitutes a preform which may be drawn into an optical fiber as shown by step 15 or, optionally, prior to drawing by step 15, it may be fit into an overclad tube in accordance with the aforementioned rod-in-tube process as shown by step 16. The overclad tube in turn is typically made in the same manner as the MCVD substrate tube; that is, it is flame deposited onto a mandrel as shown by step 17 and thereafter consolidated and drawn as shown by steps 18 and 19. Steps 12 and 19 can optionally be omitted if consolidation yield tubes of appropriate diameter.

Figure 2:
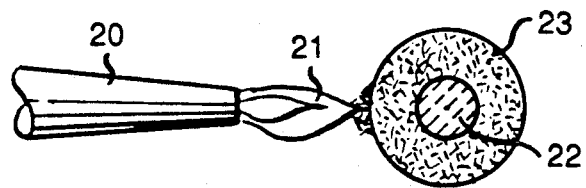
FIG. 2 is a schematic illustration of flame deposition of glass soot in accordance with an illustrative embodiment of the invention.

FIG. 2 is a schematic illustration that may be taken as illustrating flame deposition of a hollow soot cylinder in accordance with either the prior art or the present invention. A torch 20 projects an oxygen-containing gas and a fuel gas, which is ignited to form a flame 21. The torch also projects a silicon-containing material that reacts at the high temperature of the film to form a glassy soot that is deposited on a solid cylindrical mandrel 22 to form a hollow cylindrical soot cylinder 23. In accordance with the prior art, the silicon-containing reactant is transported to the torch 20 in gaseous form and projected under pressure from the torch 20 so as to be within the flame 21. This method of making either substrate tubes in accordance with step 10 of FIG. 1, or overhead tubes in accordance with step 17, results in glass of the purity and homogeneity required for ultimate fabrication into optical fibers. The rate at which such glass soot can be deposited, however, is limited and it is known in the art that if the rate of soot deposition could be significantly increased, the final cost of the finished optical fiber could, in effect, be reduced.

Figure 3:
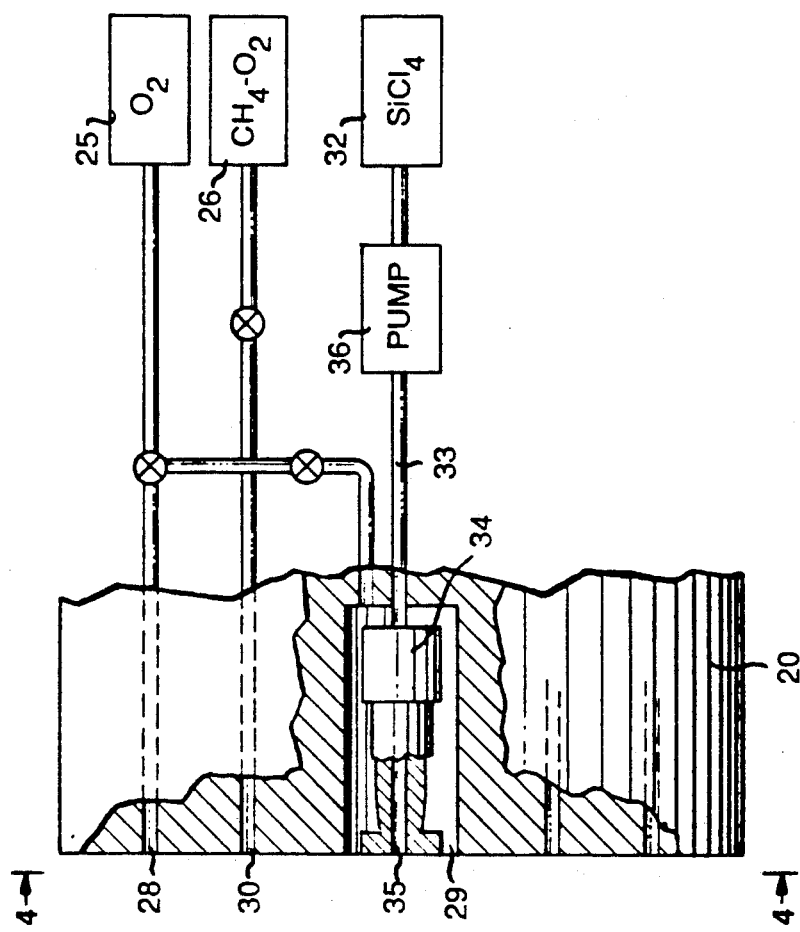
FIG. 3 is a schematic illustration of torch apparatus that may be used in accordance with an illustrative embodiment of the invention.
Figure 4:
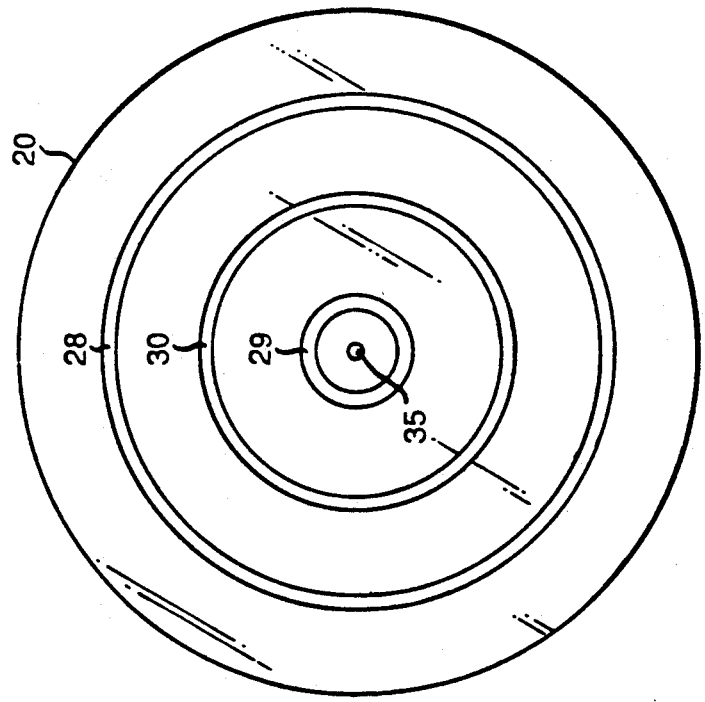
FIG. 4 is a view taken along lines 4—4 of FIG. 3.

Referring to FIG. 3, there is shown a torch 20 in accordance with the invention that may be used to deposit glass soot as illustrated in FIG. 2. As with the prior art, there is delivered to the torch an oxygen-containing gas, which may be pure oxygen from a source 25, and a fuel gas, which may be delivered from a source 26 of methane plus oxygen. These gases are transmitted under pressure to the torch 20 and are projected through orifices and ignited so as to form the flame 21 of FIG. 2. More particularly, oxygen is projected from orifices 28 and 29 while fuel gas is projected from orifice 30. As shown in FIG. 4, these orifices are basically annular in shape which leads to a flame front having a circular configuration in a plane transverse to the axis of the torch. More specifically, where the fuel gas from orifice 30 meets oxygen from orifice 28 may form a cylindrical flame front which surrounds a flame front formed by oxygen from orifice 29 and fuel from orifice 30, although in principle a single flame front could provide the heat needed for a reaction.

In accordance with the invention, a liquid silicon-containing reactant (rather than a gaseous reactant) from a source 32 is delivered via a pipe 33 to an ultrasonic nozzle 34. The ultrasonic nozzle uses high frequency acoustic energy to atomize or to break the liquid into a fine mist which is projected through a central orifice 35 shown in FIGs. 3 and 4. The silicon-containing liquid is illustratively silicon tetrachloride ($SiCl_4$) which, in its normal state, is a liquid. In prior art systems, such liquid is carried as a vapor by a metered carrier gas that is bubbled through a temperature controlled reservoir of the liquid reactant. Control of the rate of delivery of vapor in this manner is relatively expensive and relatively unreliable.

The delivery of the liquid to the acoustic nozzle is controlled by a pump 36. The nozzle 34 is of a conventional and well-known structure that atomizes the liquid to a fine mist composed of droplets approximately twenty to fifty microns in diameter. The velocity of projection of the atomized liquid from orifice 35 is comparatively low, typically 0.2 to 0.4 meters per second. This is much slower than other liquid atomizer projection velocities, that can typically be as much as twenty meters per second. We have determined that this slow velocity contributes to the relatively high rate of deposition, which is about thirty-five percent higher than deposition by a conventional system using a carrier gas and bubbler apparatus. The orifice 35 preferably has a diameter of between 0.020 and 0.250 inch, typically 0.052 inch.

Figure 5:
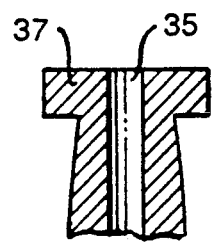
FIG. 5 is a view of part of an ultrasonic nozzle that may be used in the apparatus of FIG. 3.

The ultrasonic nozzle 34 which was used in our experiments is known as Model 87900-120, which is commercially available from the Sono-Tek Corporation of Poughkeepsie, N.Y. The configuration of the orifice 35 is shown in greater detail in FIG. 5. The surface 37 of the ultrasonic nozzle was made to be coplanar with the surfaces defining the other orifices of torch 20. Several other nozzle configurations are available from the Sono-Tek Company, but the one that was chosen has the flat surface 37 generally depicted in FIG. 5. Subsequent experiments indicate that an orifice recessed 0.020 inch may offer some advantages. The pump 36 was a Model 184 pump, commercially available from the Micropump Company, Concord, Calif., and was chosen to deliver a reproducible, pulseless flow of liquid to the ultrasonic nozzle 34. The pipe 33 was one-eighth inch outer diameter teflon (TM) tubing. The rate of delivery was between fifteen cubic centimeters per minute of liquid SiCl$_4$ and twenty-one cc/minute, although other pump rates could be chosen. The nozzle 34 was operated at 120 kilohertz and a power setting of about two watts was found to provide good atomization at a flow rate of fifteen cc/minute, although somewhat higher power settings should be used for higher rates of flow.

Referring to FIG. 2, the experiments used a rotating quartz mandrel 22. All experiments were carried out with a rotation speed of two hundred rotations per minute. The mandrel was moved axially at a rate of 1.5 centimeters a second to allow deposition over twenty-six centimeters of its length.

Studies after deposition showed complete reaction of the silicon tetrachloride in the flame producing fine particle of the desired glass soot (SiO$_2$) material. Our studies show that the material is essentially the same as the soot cylinders produced by conventional all-gaseous systems. Consolidation of the glass did not result in defects such as voids that might be produced if the soot deposition included some unreacted material. It is expected that further experiments in torch and/or nozzle design will lead to further optimization and greater increases in the deposition rate of the glass.

Figure 6:
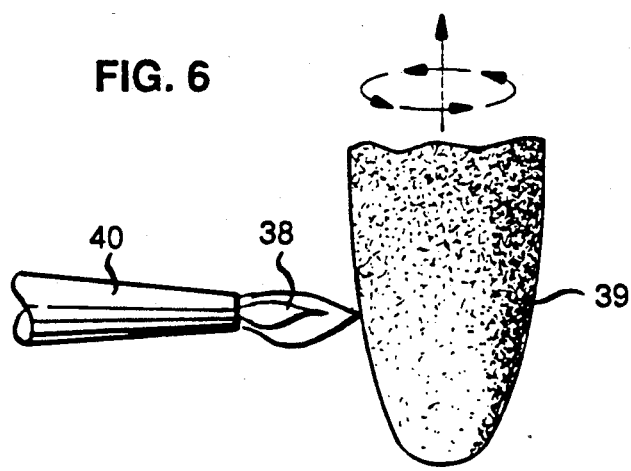
FIG. 6 is a schematic view showing the flame deposition of glass soot in accordance with another embodiment of the invention.

The invention may be used in the VAD flame hydrolysis method shown in FIG. 6 as well as the OVD method which has been described. In the VAD method, a torch 40 produces a flame 38 for depositing glass soot 39 on a bait rod that is rotated and moved axially upwardly as shown by the arrows. As is known, with this technique one achieves a solid soot cylinder which may be consolidated to constitute a fully defined preform, or which may be fitted into an overclad tube as described before to enlarge its diameter. As before, optical fiber is drawn by glass drawing from the heated and partially molten glass preform.

Little discussion has been made regarding doping of the glass soot, but it should be understood that appropriate dopants could be used with the flame pyrolysis method described. These dopants could be delivered with the liquid precursor to the ultrasonic nozzle, or they could be delivered through another orifice in gaseous form.

There appears to be no particular need for any specific parameters of the acoustic energy such as frequency that are required and no particular structural refinements needed; rather, the ultrasonic nozzle used was an "off the shelf" product that was retrofit into the torch in a straightforward manner. The invention has been demonstrated with the torch construction generally shown in FIGS. 3 and 4, and it should be understood that circular arrays of apertures could be substituted for the annular apertures 28, 29 and 30. Hydrogen is often used as the fuel gas which is surface mixed with oxygen at the face of the torch. As another alternative, the fuel could be mixed with the liquid reactant and atomized with the reactant. In this case the atomized droplets themselves combust or burn to provide heat for the reaction. If liquid tetraethylorthosilicate were used as the reactant or silicon source, there would be no need for a separate fuel source since that material itself is combustible. Different materials could be used as the mandrel 22 of FIG. 2 upon which deposition is made. Various other modifications may be made by those skilled in the art without departing from the spirit and scope of the invention.

We claim:

1. A method for making optical fiber comprising the steps of: depositing glass soot on a support structure comprising the steps of (a) projecting from a torch fuel, the fuel being ignited to form a flame, (b) projecting from the torch a reactant of appropriate composition and having appropriate properties so as to react at the temperatures produced in the flame to form a stream of glass soot and (c) collecting the soot to form a soot structure; consolidating the soot structure to a glass structure and using the consolidated glass structure as at least a component part of an optical fiber preform; and drawing an optical fiber from the preform, wherein the improvement comprises:

provides in the torch an ultrasonic nozzle;

delivering the reactant in liquid form and without a carrier gas to the torch;

and using the ultrasonic nozzle, without a gas, to apply high frequency acoustic energy to the liquid reactant so as to break the reactant into a mist and to project the mist from the torch along with said fuel.

2. The method of claim 1 wherein:
the reactant comprises silicon tetrachloride.

3. The method of claim 1 wherein:
an oxygen-containing gas and fuel are projected from the torch such as to form a flame front having a substantially circular configuration in a section taken perpendicularly to the direction in which the fuel and oxygen-containing gas are projected;

and the mist is projected from the ultrasonic nozzle along a path within the substantially circular flame front.

4. The method of claim 1 wherein:
the mist is projected from the torch at a velocity of less than about 0.8 meters per second.

5. The method of claim 1 wherein:
both the fuel and the reactant comprise liquid tetraethylorthosilicate.

6. A method for making glass comprising the steps of: depositing glass soot comprising the steps of (a) projecting from a torch a fuel gas and an oxygen-containing gas, the fuel gas being ignited to form a flame, (b) projecting from the torch a reactant of appropriate composition and having appropriate properties so as to react at the temperatures produced in the flame to form a stream of glass soot and (c) collecting the soot to form a soot structure; and consolidating the soot structure to form a glass structure wherein the improvement comprises:

providing in the torch an ultrasonic nozzle;

delivering the reactant in liquid form and without a carrier gas to the ultrasonic nozzle;

and using the ultrasonic nozzle, without a gas, to apply high frequency acoustic energy to the reactant so as to break the liquid reactant into a mist and to project the mist from the torch at a velocity of less than about 0.8 meters per second.

7. The method of claim 6 wherein:
the reactant comprises silicon tetrachloride.

8. The method of claim 7 wherein:

the oxygen-containing gas and the fuel gas are projected from the torch such as to form a flame front having a substantially circular configuration in a section taken perpendicularly to the direction in which the fuel gas and oxygen-containing gas are projected;

and the mist is projected from the ultrasonic nozzle along a path within the substantially circular flame front.

9. The method of claim 8 wherein:
the mist is projected at a velocity of about 0.2 to about 0.4 meters per second.

10. The method of claim 6 wherein:
the glass structure is used as an optical fiber preform.

11. The method of claim 6 wherein:
the glass structure is used as an overclad tube for enlarging the diameter of an optical fiber preform.

12. The method of claim 6 wherein:
the glass structure is used as a substrate tube for the deposition of glass by the MCVD method.

* * * * *

UNITED STATES PATENT AND TRADEMARK OFFICE
CERTIFICATE OF CORRECTION

PATENT NO. : 5,110,335
DATED : May 5, 1992
INVENTOR(S) : T. J. Miller and D. W. Monroe It is certified that error appears in the above—identified patent and that said Letters Patent is hereby corrected as shown below:

Column 1, line 35 "4,4820,322" should read --4,820,322--; Column 2, line 7 "rat" should read --rate--; Column 2, line 38 "to" should read --of--. Column 3, line 57 "yield" should read --yields--; Column 4, line 62 "87900-120" should read --8700-120--. Column 5, line 25 "particle" should read --particles--; Column 6, line 34 after "and" insert --the--. Column 7, line 8 "ultrasonic nozzle" should read --torch--.

Signed and Sealed this

Twenty-fourth Day of August, 1993

Attest:

BRUCE LEHMAN

Attesting Officer     Commissioner of Patents and Trademarks